No. 726,378. PATENTED APR. 28, 1903.
Z. R. TUCKER.
SPINDLE HEAD AND BEARINGS THEREFOR.
APPLICATION FILED JAN. 8, 1902.
NO MODEL.

WITNESSES:
H. L. Amer.
H. M. Seamans

INVENTOR
Zechariah R. Tucker
BY
Duell, Megrath & Warfield
ATTORNEYS

UNITED STATES PATENT OFFICE.

ZECHARIAH RHODES TUCKER, OF PROVIDENCE, RHODE ISLAND, ASSIGNOR TO UNIVERSAL MACHINE COMPANY, OF PROVIDENCE, RHODE ISLAND, A CORPORATION OF RHODE ISLAND.

SPINDLE-HEAD AND BEARINGS THEREFOR.

SPECIFICATION forming part of Letters Patent No. 726,378, dated April 28, 1903.

Application filed January 8, 1902. Serial No. 88,859. (No model.)

*To all whom it may concern:*

Be it known that I, ZECHARIAH RHODES TUCKER, residing at Providence, in the county of Providence and State of Rhode Island, have invented certain new and useful Improvements in Spindle-Heads and Bearings Therefor, of which the following is a full, clear, and exact description, such as will enable others skilled in the art to which it appertains to make and use the same.

This invention relates to spindle-heads and bearings therefor, and has for its object to provide a construction of increased efficiency and durability.

To this end the invention consists in the features of construction and combinations of elements, as will be specifically set forth hereinafter, and the novel features thereof pointed out in the claims at the end of this specification.

Figure 1:
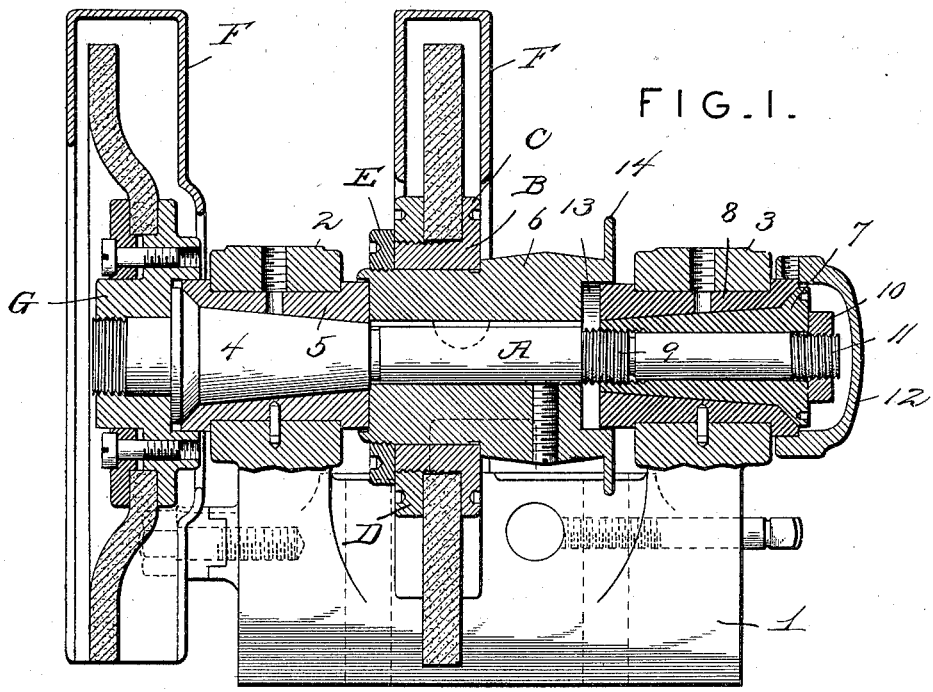
Figure 2:
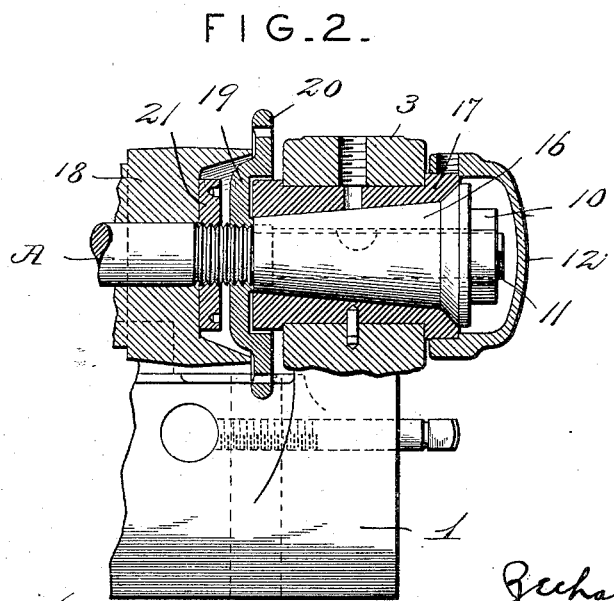

In the accompanying drawings, Figure 1 is a longitudinal sectional view of the spindle and bearings therefor, showing grinding-wheels located thereon. Fig. 2 is a sectional view of a modified form of bearing for one end of the spindle.

Similar reference characters refer to similar parts throughout the several views.

A suitable base 1, which is preferably of one solid piece, in order to absorb vibration, is provided with upright supports 2 and 3, the tops or caps of which may, if desired, be hinged in order that they may be thrown back easily to permit removal of the spindle A.

The spindle A is provided, as shown, at the left with a fixed conical bearing 4, fitting a box 5, which is supported in the upright 2. Driving-pulley 6 is keyed to the spindle A and carries seated thereon a wheel-hub B, which carries the grinding-wheel in a socket provided between an annular flange C and a threaded retaining-ring D. A threaded retaining-ring E, screwed onto one end of pulley 6, holds the wheel-hub in place. Suitable guards F may be provided when desired.

A second wheel-head G may be screwed onto the threaded end of the spindle outside the bearing 4 when it is desired; otherwise a dust-cap would be provided. Conical bearing 7 at the right-hand end is made in the form of a sleeve ground inside and out to fit the spindle and the box 8. The spindle has a thread formed thereon at the point 9, on which screws the threaded inner end of the bearing 7, and the lock-nut 10 on the threaded end 11 of the spindle holds the bearing in place. The spindle is oppositely threaded at these points 9 and 11, one being a left-hand thread and the other a right-hand thread, as shown, so that as the spindle rotates the force tending to move the bearing 7 outward is checked by the lock-nut 10 tending to move inward, whereby a very strong and durable construction is obtained, as will readily be perceived. When it is desired to adjust the bearings for the purpose of taking up wear or for other purposes, this may be done by turning the bearing-sleeve 7 in either direction and adjusting the lock-nut 10 accordingly. Pulley 6 is recessed, as shown at 13, at each end, in order that it may fit over the bearing-boxes to exclude dust, and at one end it is provided with an annular flange 14, which acts as a guide for the belt.

It will be seen that the conical bearings 4 and 7 have their small ends pointing inward or toward each other—*i. e.*, they are oppositely inclined. As the spindle expands in diameter it also elongates, pushing the conical bearings farther apart, thereby relieving them in their bearings to an amount equal to the increase in diameter. When the spindle contracts, a reverse action takes place. Hence the spindle can always be kept adjusted almost "metal to metal" without danger of the parts "sticking" or "roughing up" whether the changes in temperature are due to internal or external causes. This has been found practically impossible with bearings of other construction, for if they are closely adjusted when cold when they expand the film of oil is squeezed out and the metal surfaces come in contact and stick. On the other hand, if they are adjusted so as to run free when hot there is too much play when cold. A rate of taper can be provided by proper grinding of the boxes and bearings, such that a spindle of this construction will be self-compensating in its bearings for any expansion or contraction caused by changes in temperature.

In the modification shown in Fig. 2 in place of the bearing-sleeve 7, threaded in its inner end, a sleeve 16 is shown, which is keyed to the spindle A and fitted to the box 17.

Thus when it is desired to adjust this bearing-sleeve it is simply moved longitudinally of the spindle, and it is held in the desired adjusted position by means of lock-nuts 19 and 10, oppositely threaded, as before. The outwardly-projecting flange 20 of lock-nut 19 forms in the case the side guide for the pulley 18. Inner lock-nut 21, located within the recessed head of the pulley, is provided to prevent the pulley and adjacent bearings being forced off by pressure applied at the other end of the spindle—as, for instance, in applying an end wheel-head, such as G in Fig. 1.

The internal diameter of the hub of the wheel-head or center B is such that it may in removing it be passed over the outside of the box 5. Thus the wheels may be replaced in order to have a true wheel without having to turn off the wheel in position, thereby saving labor and waste of wheel, and inasmuch as it is not necessary to move the box in removing the wheel-head this can be done without danger of getting dust into the bearings.

The modified form of bearing shown in Fig. 2 is in some respects a preferable one. Theoretically, of course, the inside and outside faces of a bearing-sleeve, such as sleeve 7, are ground mathematically correct, so that there will be no eccentricity. Practically, however, it often occurs that while there is a certain amount of eccentricity as between the bearing-sleeve and the spindle the parts run smoothly, because the eccentricity of one compensates for the eccentricity of the other. However, when the bearing-sleeve 7 is rotated for adjustment such error, if any, would become apparent to the detriment of the bearing. Consequently in constructions such as shown in Fig. 1 it would be necessary that the relation between the bearing-sleeve and the spindle be correct along every radius in order to procure the best results. In a construction such as shown in Fig. 2, however, where the bearing-sleeve is not moved circumferentially of the spindle, it is only necessary that the bearing be adjusted for a given position, and if there are compensating errors they will not become apparent, as in the construction shown in Fig. 1.

While I have described my invention in connection with the spindle of a grinding-machine, it will be obvious that it is not limited thereto. The wheel-centers may be adapted to carry any desired tool, the self-compensating spindle may be used in a variety of machines, and the novel form of bearings shown may have a wide range of utility in connection with various constructions.

Having described my invention, what I claim as new, and desire to secure by Letters Patent, is—

1. In combination, a spindle provided with conical bearing-surfaces which have their small ends pointing inward or toward each other, and suitable boxes or bearing-sleeves coöperating and contacting therewith.

2. In combination, a spindle provided with conical bearing-surfaces which have their small ends pointing inward or toward each other, and suitable boxes or bearing-sleeves coöperating with said bearing-surfaces and contacting therewith throughout the length of said surfaces.

3. In combination, a spindle provided with inclined bearing-surfaces at its ends, the inclination of each of said bearing-surfaces being toward the center of the spindle, and suitably-supported boxes or bearing-sleeves coöperating and contacting with said bearing-surfaces, whereby the variations in diameter of the bearing-surfaces due to expansion will be compensated for by the variations in length of the spindle, substantially as and for the purposes set forth.

4. In combination, a spindle, a bearing-piece adjustable thereon, said spindle having right and left hand threads adjacent each end of said bearing-piece, and threaded members in connection with said bearing-piece, whereby said bearing-piece may be held firmly in position.

5. In combination, a spindle A, a bearing-piece 16 adjustable thereon, said spindle being provided with oppositely-directed screw-threads adjacent the ends of said bearing-piece, and the adjusting and locking nuts 19 and 10 substantially as and for the purpose set forth.

6. In combination, a spindle, a conical bearing-piece adjustable thereon, said spindle having right and left hand threads adjacent each end of said bearing-piece and threaded members in connection with said bearing-piece, whereby said bearing-piece may be held firmly in position.

7. In combination, a spindle, a longitudinally-movable bearing-piece thereon, suitable boxes for said bearing-piece, a right-hand lock-nut on the outer end of said spindle for holding said bearing-piece, there being a left-hand thread on said spindle adjacent the inner end of said bearing-piece, and a threaded retaining part in connection with said bearing-piece, whereby the force exerted during the rotation of the spindle tending to move the bearing-piece longitudinally of the spindle will be balanced between said lock-nut and said retaining-piece.

8. In combination, a spindle, suitable bearing-pieces and boxes therefor, a driving-pulley on said spindle between said bearings, a tool-carrying hub removably seated on said pulley and having the internal diameter thereof greater than the diameter of said spindle-boxes whereby said hub may be removed without removing said boxes.

In testimony whereof I affix my signature in the presence of two witnesses.

ZECHARIAH RHODES TUCKER.

Witnesses:
HENRY C. BABCOCK,
ALICE H. ABOM.